US010708333B2

(12) United States Patent
Rakshit et al.

(10) Patent No.: US 10,708,333 B2
(45) Date of Patent: Jul. 7, 2020

(54) STREAMING MEDIA AUGMENTATION AND DELIVERY

(71) Applicant: INTERNATIONAL BUSINESS MACHINES CORPORATION, Armonk, NY (US)

(72) Inventors: Sarbajit K. Rakshit, Kolkata (IN); Aaron K. Baughman, Silver Spring, MD (US); Gary F. Diamanti, Wake Forest, NC (US); Mauro Marzorati, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/134,237

(22) Filed: Sep. 18, 2018

(65) Prior Publication Data

US 2020/0092343 A1 Mar. 19, 2020

(51) Int. Cl.
| H04N 7/10 | (2006.01) |
| H04N 7/025 | (2006.01) |
| H04L 29/06 | (2006.01) |
| H04N 21/81 | (2011.01) |
| G06Q 30/02 | (2012.01) |

(Continued)

(52) U.S. Cl.
CPC ....... *H04L 65/602* (2013.01); *G06Q 30/0242* (2013.01); *H04L 65/4069* (2013.01); *H04N 21/235* (2013.01); *H04N 21/23424* (2013.01); *H04N 21/251* (2013.01); *H04N 21/25891* (2013.01); *H04N 21/812* (2013.01)

(58) Field of Classification Search
CPC .................................................. H04N 21/812
See application file for complete search history.

(56) References Cited

U.S. PATENT DOCUMENTS 10,289,296 B1 * 5/2019 Zhang ................. G06F 17/2247
2004/0210824 A1 * 10/2004 Shoff ................. H04N 5/44543
715/201

(Continued)

OTHER PUBLICATIONS

Thomas, J., "Advertising Effectiveness", Decision Analyst, 2016, 4 pgs. Retrieved on Sep. 4, 2018 from the Internet URL: <https://www.decisionanalyst.com/whitepapers/adeffectiveness/>.

(Continued)

*Primary Examiner* — Gigi L Dubasky
(74) *Attorney, Agent, or Firm* — Brian Restauro; Matthew M. Hulihan; Heslin Rothenberg Farley & Mesiti PC

(57) ABSTRACT

Streaming media augmentation and delivery includes identifying target streaming media to be streamed to a user device of a user, categorizing streaming media available for augmenting the target streaming media, and producing, based on the categorizing, a set of candidate augmentation streaming media, selecting at least one augmentation streaming media of the set and augmenting the target streaming media with the selected at least one augmentation streaming media to produce an augmented steaming media, where each selected augmentation streaming media is selected based at least in part on the selected augmentation streaming media being a demonstration of application(s) of a subject of the target streaming media, and based on an initiation to stream the target streaming media to the user device, streaming the augmented streaming media to the user device.

16 Claims, 8 Drawing Sheets

(51) Int. Cl.
*H04N 21/235* (2011.01)
*H04N 21/25* (2011.01)
*H04N 21/258* (2011.01)
*H04N 21/234* (2011.01)

(56) References Cited

U.S. PATENT DOCUMENTS

| | | | |
|---|---|---|---|
| 2007/0234213 A1* | 10/2007 | Krikorian | H04N 21/23406 715/716 |
| 2011/0321114 A1* | 12/2011 | Newell | H04N 21/234318 725/146 |
| 2014/0025992 A1* | 1/2014 | DeRoos | G06F 11/0793 714/25 |
| 2014/0114758 A1 | 4/2014 | Bentley | |
| 2014/0165086 A1 | 6/2014 | Avedissian et al. | |
| 2014/0330930 A1 | 11/2014 | Harnevo et al. | |
| 2015/0074711 A1* | 3/2015 | Spitz | H04N 21/25866 725/32 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

STREAMING MEDIA AUGMENTATION AND DELIVERY

BACKGROUND

Online streaming media refers to multimedia (e.g. video, audio, text, graphics/images, etc.) that is delivered and presented to a user. It is common to deliver online streaming media to a user for any of a variety of reasons, for instance when serving an advertisement to the user's web browser. It is known that advertisements can be very ineffective in terms of positively influencing user purchasing decisions.

SUMMARY

Determining how to effectively create streaming media to reach a target audience can be difficult, as a high percentage of such media is ineffective at accomplishing the intent behind its conveyance.

Shortcomings of the prior art are overcome and additional advantages are provided through the provision of a computer-implemented method. The method identifies target streaming media to be streamed to a user device of a user. The method categorizes streaming media available for augmenting the target streaming media, and produces, based on the categorizing, a set of candidate augmentation streaming media. The method also selects at least one augmentation streaming media of the set of candidate augmentation streaming media, and augments the target streaming media with the selected at least one augmentation streaming media to produce an augmented steaming media. Each selected augmentation streaming media is selected based at least in part on the selected augmentation streaming media being a demonstration of application(s) of a subject of the target streaming media. The method additionally streams, based on an initiation to stream the target streaming media to the user device, the augmented streaming media to the user device.

Further, a computer system is provided that includes a memory and a processor in communication with the memory, where the computer system is configured to perform a method. The method identifies target streaming media to be streamed to a user device of a user. The method categorizes streaming media available for augmenting the target streaming media, and produces, based on the categorizing, a set of candidate augmentation streaming media. The method also selects at least one augmentation streaming media of the set of candidate augmentation streaming media, and augments the target streaming media with the selected at least one augmentation streaming media to produce an augmented steaming media. Each selected augmentation streaming media is selected based at least in part on the selected augmentation streaming media being a demonstration of application(s) of a subject of the target streaming media. The method additionally streams, based on an initiation to stream the target streaming media to the user device, the augmented streaming media to the user device.

Yet further, a computer program product including a computer readable storage medium readable by a processing circuit and storing instructions for execution by the processing circuit is provided for performing a method. The method identifies target streaming media to be streamed to a user device of a user. The method categorizes streaming media available for augmenting the target streaming media, and produces, based on the categorizing, a set of candidate augmentation streaming media. The method also selects at least one augmentation streaming media of the set of candidate augmentation streaming media, and augments the target streaming media with the selected at least one augmentation streaming media to produce an augmented steaming media. Each selected augmentation streaming media is selected based at least in part on the selected augmentation streaming media being a demonstration of application(s) of a subject of the target streaming media. The method additionally streams, based on an initiation to stream the target streaming media to the user device, the augmented streaming media to the user device.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
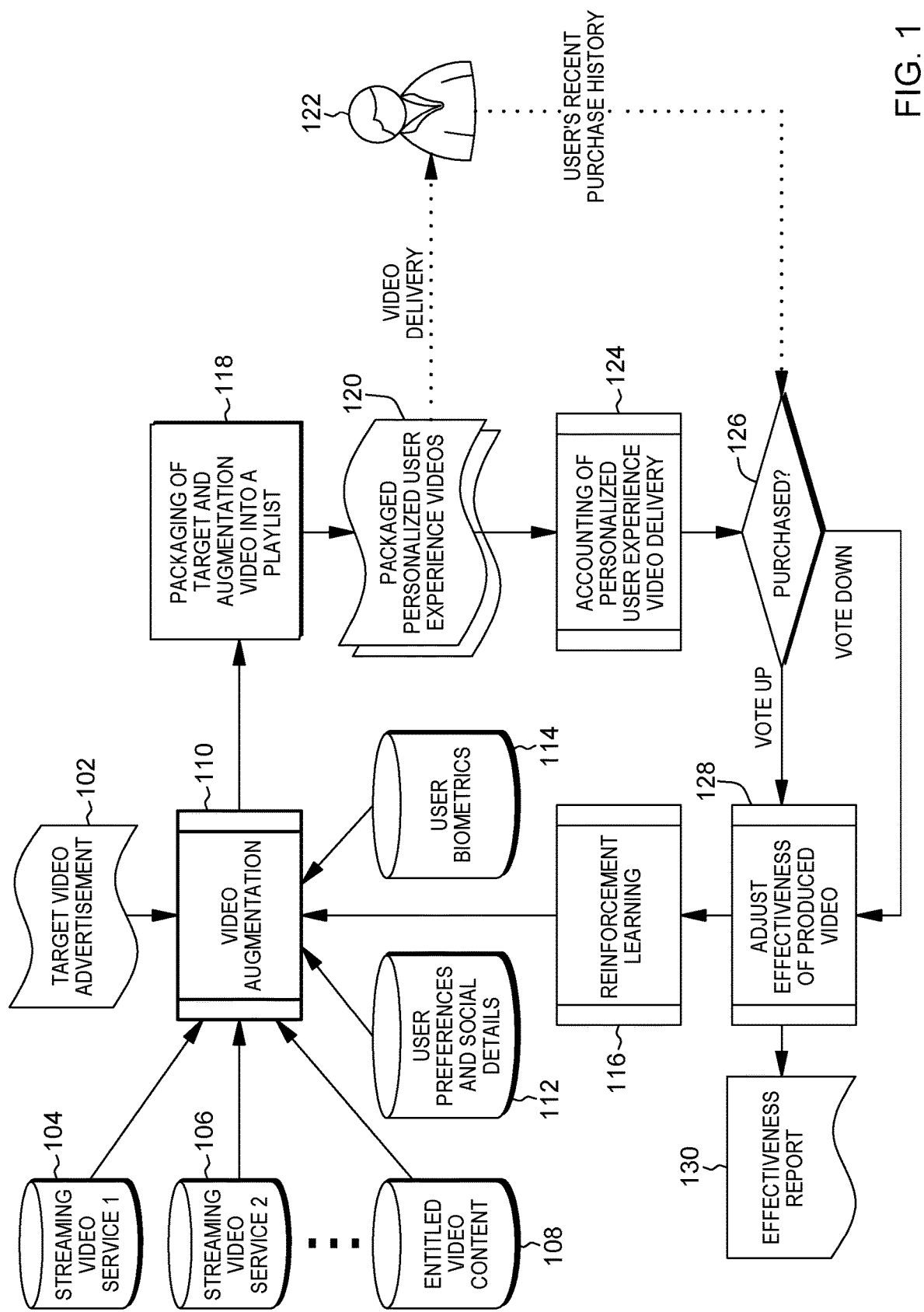
FIG. 1 depicts an example flow for streaming media augmentation and delivery, in accordance with aspects described herein.

Described herein are aspects for tailored streaming media augmentation and delivery. Example embodiments identify user characteristics, and build and deliver streaming media content directed to user desires, for instance solutions to problems that the users face. If a particular solution, such as a product or service, addresses a problem the user is known to face, streaming media that advertises the solution, together with snippets demonstrating how the proposed solution can solve the user's problem, can be built and streamed to the user. Aspects can also track user behavior in response to streaming media delivery and measure whether/how the built streaming media influences user decision-making, for instance when making purchases.

In some aspects, streaming media is automatically generated and targeted to the appropriate users. The media can include base media that is augmented and enhanced by, e.g., real-world uses or applications of a subject (e.g. product, service) of the base media and social media content. The resulting augmented streaming media can provide a unique, customized end-user experience to solve perceived problems of the user, for instance by demonstrating standard and alternative product/service uses. The augmented streaming media can include any of variously-source streaming media, for instance media in the public domain and/or that is publicly accessible (such as text-based documentation, television infomercials, videos from streaming services, and product review information, as examples) to create a targeted streaming media to address solutions to user problems or other desires of the user.

In particular embodiments, an end-user's problem or motivation for consuming products or services is ascertained. A cognitive or other system can automatically create augmented streaming media built from a target streaming media and one or more augmentation streaming media, for instance a series of instructional videos depicting real-world usage of the product or service. The augmentation streaming media can be prepended, appended, overlaid (e.g. in a picture-in-picture fashion), or inserted, as examples, to existing base media to create augmented streaming media that is presented to the user. Aspects can monitor effectiveness of the augmented streaming media in driving a particular outcome. This tracked effectiveness can be input into the cognitive system for machine learning. In a particular example, the machine learning learns which streaming media is most effective for different users, and types thereof, at influencing user purchasing decisions.

As described in further detail below, target streaming media can be augmented offline, a priori, to generate augmented streaming media that is referenced for on-demand playback. Additionally or alternatively, the generation of augmented streaming media may be performed just-in-time (on-demand), in which the base/target video plays for the user and is dynamically augmented as this occurs to produce the augmented video in real-time when viewed by the user.

In particular examples, the augmented streaming media is a base/target video augmented with other videos depicting alternative uses of the products or services being advertised in the target video.

Augmentation streaming media as used herein refers to media that is, or may be, used to augment a target streaming media. The augmentation streaming media can be in the form of audio and/or video files that augment a target streaming media file to form augmented streaming media for streaming to users. Example augmentation streaming media is publicly available streaming media, for instance media (e.g. videos) that are produced and available for public consumption. Many streaming services exists where users can post videos for public access by others. Another example source for augmentation streaming media is private or licensed videos that are available to particular users, for instance based on a subscription or other form of entitlement. Examples are videos that are produced and are available for use only by private entities, under license, or to subscribers. This is also referred to herein as "entitled" media or content, referring to entitlement of other uses to view/access the content.

Target or base streaming media as used herein refers to media that is augmented with augmentation streaming media. Like augmentation streaming media, it too may be any type of multimedia, for instance audio and/or video. The target streaming media is the unimproved baseline media that would otherwise be presented to a user. In some embodiments, the target streaming media is a streaming media advertisement—multimedia content that is playable in streaming fashion to target recipients—for a subject, such as a produce and/or service. As described herein, initiation to stream the target streaming media to the user may trigger streaming of augmented streaming media, specifically an augmented version of the target streaming media, in place of the target streaming media. Identification of the target streaming media, such as a video and/or audio advertisement, to be streamed to a user device of a user can trigger aspects described herein.

The augmented streaming media is in some embodiments implemented as a 'packaged' video. Such a packaged video may be a logical container of the baseline (target) video identification marks/characteristics (such as description of the media, applicable demographics, and so on), together with instructions for creating the augmented video experience (for instance a playlist with links or identifiers of the augmentation media) and indicators as to the particular ways the augmentation media should augment the target media, and measured effectiveness of the augmented video against particular demographics. The packaged video may be an output of processes described herein. Streaming of a packaged video is in some examples provided by a stream of a video file, such as an MP4 file, or as a playlist to client software that assembles the video components for presentation to the user.

FIG. 1 depicts an example flow for streaming media augmentation and delivery, in accordance with aspects described herein. In some examples, the flow is performed by one or more computer systems.

The flow includes an identification 102 of the target streaming media (in this example an advertisement) to be streamed to a user device of a user. The context for the selection and identification of the target video advertisement could be anything, for instance the user having visited a web site that feeds an advertisement to the user, the user loading a video on a streaming service and the advertisement being streamed before the video plays, or the user viewing a television program and viewing the advertisement as a commercial during a program, as examples.

Meanwhile, a process categorizes streaming media that is available for augmenting the target video advertisement. The categorizing produces a set of candidate augmentation streaming media, that is, augmentation streaming media that are candidates for augmenting the target advertisement. The categorized streaming media can include, for instance, snippets of publicly-available streaming media, social media-sourced streaming media, and/or privately-available streaming media made available to users (particularly at least users to whom the augmented version of the target media is to be streamed) on a subscription or entitlement basis. In FIG. 1, the sources of the augmentation streaming media include streaming video sources 1 and 2 (104, 106) and entitled video content 108.

At least one augmentation streaming media of this set of candidate augmentation streaming media can be selected and used to augment (110) the target video advertisement with the selected at least one augmentation streaming media to produce an augmented steaming video. Factors such as user preferences and social media details (112), user biometrics (114), and any other user characteristics can inform this selection. In some examples, the selection is based on the content of the target advertisement and on correlating that to a classification of the user's preferences, a social media footprint, and/or any desired information about the user. User biometrics 114 can inform about lifestyle and other characteristics of the user that might be relevant to augmentation media selection and delivery.

In some examples, one or more of the selected augmentation streaming media is selected based at least in part on the selected augmentation streaming media being a demonstration of application(s) of a subject of the target video advertisement. The subject of the target video advertisement can be a product or service and the application(s) can include use(s) of the product or service. Additionally or alternatively, the target video advertisement could be an advertisement and/or instructional video depicting a standard use of the product or service, and a selected augmentation streaming media can depict an alternative use for that product or service. In some embodiments, a process identifies a user problem that the product or service addresses and a selected augmentation streaming media is selected based on it being recognized, described, tagged, or the like, as demonstrating a solution to the identified user problem.

The selection can also be based on reinforcement learning (116) that is fed-back from later aspects of the flow.

Returning to FIG. 1, the flow augments 110 the target video with the augmentation streaming media selected from the candidate (library) of categorized augmentation streaming media. Augmentation can refer to one or more of: prepending selected augmentation streaming media to the target, appending selected augmentation streaming media to the target, overlaying the target with selected augmentation streaming media, and/or inserting selected augmentation streaming media into the target.

The flow packages this target and augmentation media into a packaged augmented streaming media (in this example a playlist) 118.

It is noted that while the selection, augmentation, and packaging may be done based on characteristics of a particular user, it could also be more generalized, i.e. for groups of users who fit into those characteristics. In this manner, a library of packaged videos can be built and personalized for either an individual unique user or for different user types and characteristics, and not necessarily built for any individual unique user.

In any case, eventually the augmented video is streamed to the subject user 122. Thus, based on an initiation to stream the target video advertisement to a user device (for instance the user loads a webpage with a targeted advertisement to be streamed to the user), the flow instead (or in addition) streams the augmented/packaged video to the user device. In this manner, based on a call for the target video to be delivered to the user, the augmented video is delivered. The augmented video could be delivered in place of the target, or both could be delivered if desired.

The streamed video is one of a collection packaged personalized user experiences videos 120 that are streamed to the user. An accounting 124 of the personalized user experience video delivery is maintained, for instance as a list of particular personalized videos that were delivered to the user. The user's purchase history can also be monitored using any desired techniques, for instance by tracking online activity such as website browsing and received or sent emails of the user to determine purchases that user makes. In conjunction with each other, these two items can inform whether particular products/services advertised to the user were purchased. A determination 126 is made on this basis as to whether particular products/services advertised to the user in the form of augmented streaming media were purchased. Indications of the effectiveness of the produced augmented videos can be adjusted 128 based on whether they are deemed to have influences user purchase decisions, and an effectiveness report 130 generated. As a basic example, each video can receive a vote up if it was deemed to positively influence the user into purchasing the subject of the advertisement and receive a vote down if it was deemed to negatively influence (or have no influence) on the user's purchasing decision for the subject of the advertisement. These effectiveness indications can be of any desired granularity. For instance, an augmented video could have a poor rating in influencing users of one demographic but a very good rating in positively influencing users of another demographic. An effectiveness rating can be maintained for each such demographic. It is possible that a given video could have tens or hundreds of effectiveness ratings indicative of the effectiveness of a corresponding tens or hundreds of different contexts.

As indicated, the production of the augmented steaming media occurs in some embodiments a priori, i.e. prior to identifying a particular user to receive the augmented streaming media and prior to an initiation to stream the target streaming media to the user. This is referred to herein as 'offline' augmentation. In this aspect, augmented streaming media can be built with regard to user likes, problems, desired solutions, characteristics, and so on, and in some examples done so without regard to a specific user. The augmented media is to be streamed at a later point in time, after identifying a particular user and initiation for the target media. The augmented media built from the target media that has been augmented appropriately (fitting for subject user(s)) is then delivered to a user.

Figure 2:
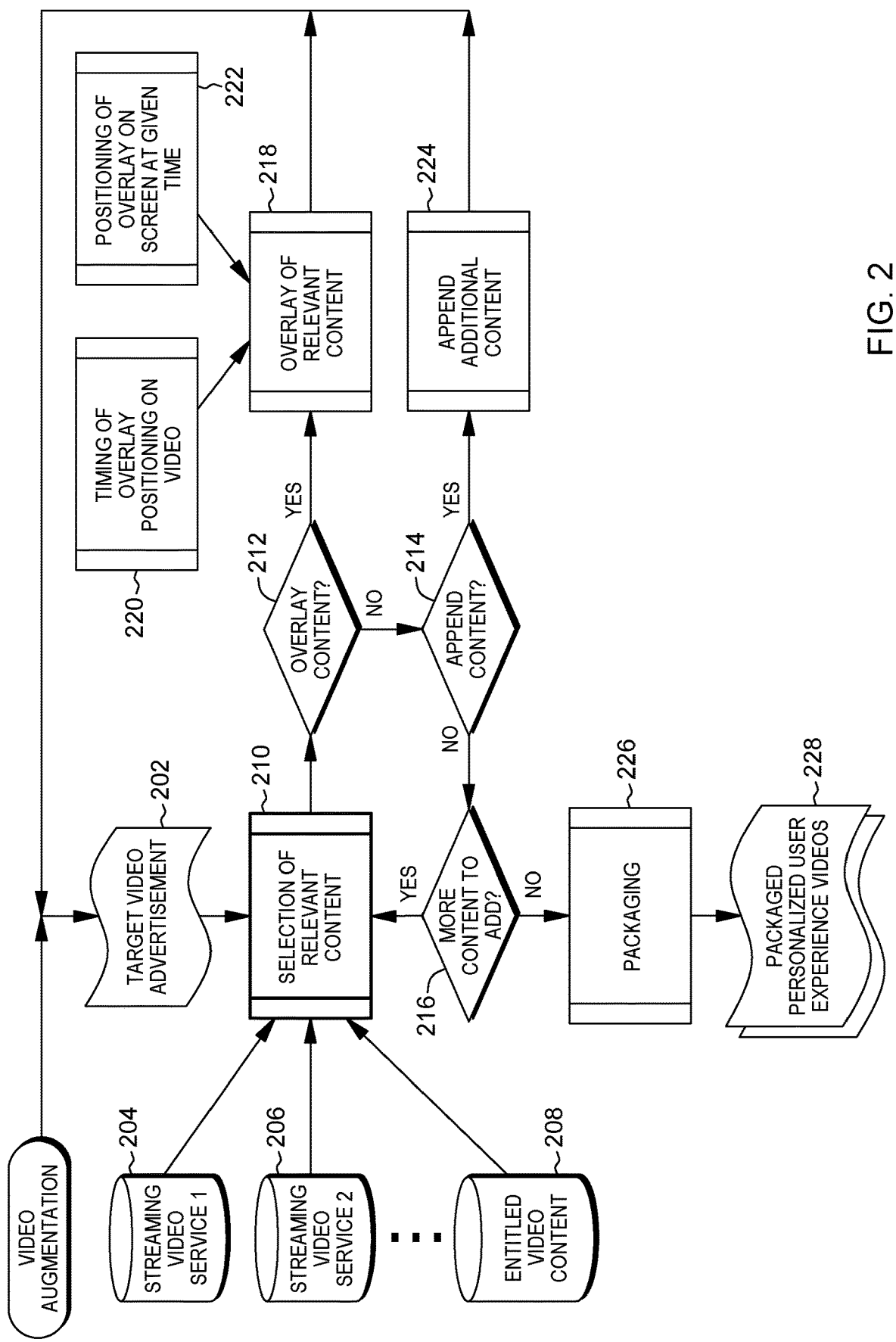
FIG. 2 depicts an example offline video augmentation flow, in accordance with aspects described herein.

FIG. 2 depicts an example offline video augmentation flow, in accordance with aspects described herein. In some examples, the flow is performed by one or more computer systems. Initially, an identification and categorization of existing publicly-available (204, 206) and entitled/privately-available (208) media is done, for instance with markup of the relevant information to identify/isolate candidate augmentation media (remove introductions, etc.). In this manner, streaming media available for augmenting target streaming media is categorized. This produces, based on the categorizing, a set of candidate augmentation streaming media. For a given target video advertisement 202 selected for processing, the flow selects 210 relevant augmentation streaming media from the candidate augmentation streaming media for augmenting the target video. The selected augmentation media of the candidate augmentation media is used to augment the target to produce the augmented video.

For each selected augmentation media, the flow may augment the target video with the selected augmentation media at the appropriate time along the target video and according to the augmentation criteria (prepend, append, insert, overlay). In this example, the flow overlays, appends, or skips the selected the content. Thus, after selecting an augmentation streaming media, the flow determines 212 whether to overlay the content. If not, the flow determines 214 whether to append the content to the target. If not, the flow proceeds to 216 where it determines whether there is more selected content to add.

If it is determined to overlay the content (212, YES), the flow overlays the content (218) over the target, considering the timing 220 for the overlay and the positioning/sizing 222 of the overlay of the augmentation streaming media. Thus, as part of the augmenting, this can include determining a timing at which the selected augmentation video is to be visually presented to overlay the target video, and a position for the selected augmentation video in overlaying the target video. When the augmented video is streamed for the user (i.e. to the user device), this presents the selected augmentation streaming media at the determined timing and position (which may also include the size of the overlay). In some examples, the positioning, size, and timing of the overlay within the base video's frame can be selected to ensure it does not obscure important parts of baseline video. The timing, positioning, and sizing are also characteristics of the overlay that can be tweaked based on machine learning to find where the overlay is most effective at driving desired user decision-making.

If instead it is determined to append the augmentation media to the target (214, YES), the flow appends 224 the augmentation media to the target.

In the example of FIG. 2, the selection and augmentation process is iterative. It selects a next augmentation streaming media to overlay or append to the target, then augments (overlays or appends) that media to produce what is referred to herein as an updated target streaming media. This is an updated version of the target streaming media—updated in that it includes the appended material. This updated target streaming media is the target streaming media used in a next iteration of the iterating for the selecting and the augmenting. In other words, the first augmentation changes the original target to result in an updated target. This updated target is then considered for possible further augmenting. The augmented video is fed back into the process at updated target video advertisement 202 for consideration whether further augmenting is desired. This may be useful in situations where it is not desired to determine at the outset the entire collection of augmentation media that is to augment an initial target; each added augmentation media results in an updated baseline to consider for possible additional augmentation.

At 216, it is determined whether there is more content to add. This can be based on any desired considerations, for instance total length or size of the current augmented video and/or anticipated length of user attention to the augmented video, as examples. When there is no more augmentation media to add (216, NO), the flow proceeds by packaging and saving 226 the video for on-demand playback. The saved video can be indexed by a baseline/target video identifier, for instance.

The augmented video is part of a packaged personalized end-user experience videos collection 228, for instance when is it selected for presentment to the end-user.

Based on the initiation to stream the target streaming media (video) to the user, the user and an associated user profile of the user can be identified. The user profile refers generically to whatever information is desired for use to correlate an augmentation video to the particular user. The augmented streaming media can be selected for presenting to the user from a library of prior-produced packaged augmented streaming media, based on the user profile matching to the selected augmented streaming media. In some examples, a classification of user need is matched to the augmented video's characteristics. After selecting the augmentation video for presenting to the user (for example in place of streaming the target to the user), this initiates the streaming of the augmented streaming media to the user device and the augmented video is presented to the end-user.

In cases where a target video is identified but no augmented video exists that would match to the particular user characteristics for the end user requesting the target video, then the target video can be queued to an offline augmentation work queue. That can initiate the flow of FIG. 2 for that particular target video. Additionally or alternatively, this offline augmentation of a target can be speculative/preemptive, where processing is performed in advance of the need.

As described above, purchase history of users can be ascertained from several merchant, manufacturer and/or end-user driven methods and correlated to video presentment and age of presentment to the user. Effectiveness of videos can thereby be ascertained and updated in the augmented video's package characteristics.

Figure 3:
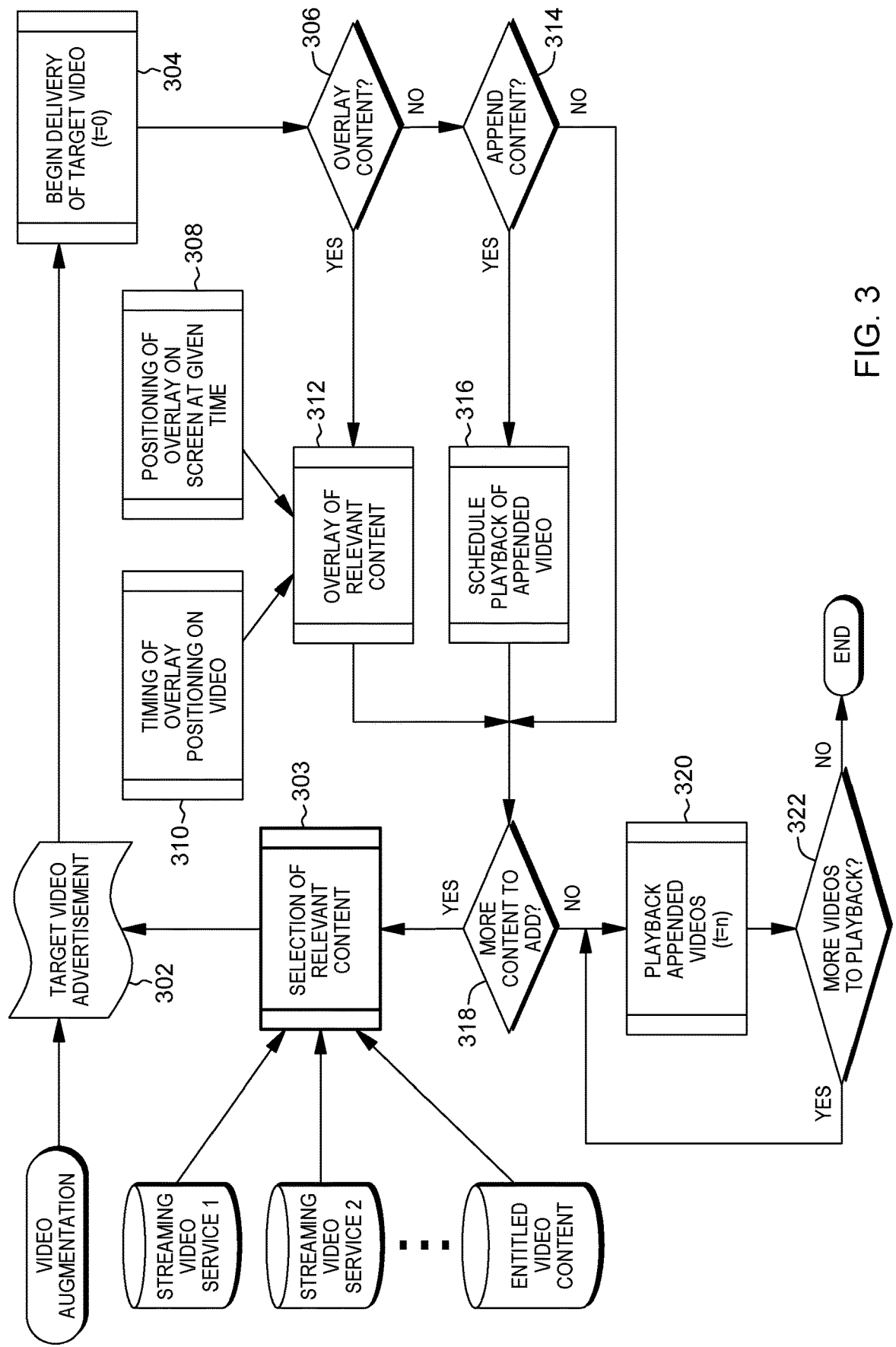
FIG. 3 depicts an example online video augmentation flow, in accordance with aspects described herein.

In some embodiments, the generation of augmented streaming media may be performed just-in-time (on-demand), in which the base/target video plays for the user and is dynamically augmented as this occurs to produce the augmented video in real-time when viewed by the user. This is referred to herein as 'online' augmentation. FIG. 3 depicts an example online video augmentation flow, in accordance with aspects described herein. Some aspects of the flow of FIG. 3 are similar or the same as those of FIG. 2.

In online augmentation, the target 302 is initially selected to stream to the user, and this identifies the target. It can also initiate streaming of the target, which also serves to initiate streaming of the augmented video since the augmentations are determined and performed in real-time against target to effectively create the augmented video as it is delivered. Thus, the initiation to stream the target streaming media to the user identifies the target streaming media and triggers the selection of the one or more augmentation streaming media. The selection can be based on a user profile matching to the selected augmentation streaming media. As part of the streaming, the flow can commence streaming 304 the target streaming media to the user device, and perform the augmenting the target streaming media dynamically, and in real time, to simultaneously produce the augmented streaming media and stream the augmented streaming media to the user device.

A classification of user need can be performed. This may be done beforehand or in real-time. It can be determined based on the classification whether the target video is to be augmented, for instance whether it could be augmented with additional content that demonstrates use(s) of the product/service that are alternative to what is conveyed in the target media itself.

The target video 302 is selected for processing. In some examples, the augmentations of other videos, for instance those in a same category as the target, are accessed and can inform augmentations to make to the current target. Augmentation videos are selected 303 from candidate videos and target video presentment begins 304. For each selected video, the augmentation is made at an appropriate time relative to the target video according to the augmentation criteria. If content is to be overlaid (306, YES), positioning/sizing 308 of the overlay within the target video's frame (e.g. to ensure not to obscure important parts of target video frame) and timing of the overlay 310 are determined and inform the proper timing and characteristics of the overlay 312 as the target video streams to the user device. If not overlaid, the content may be for appending (314, YES) where the augmentation media is scheduled 316 for playback as appended augmentation media. Appended videos are scheduled to be played back at the end of target video streaming.

After augmenting with a selected augmentation streaming media (or perhaps skipping the selected augmentation media if determined not to overlay or append that selected media), it is determined at 318 whether there is additional augmentation media to add. If so, an additional media is selected and the process iterates. It is seen that, as in the example of FIG. 2, the augmentation can be an iterative process in which an augmentation of the video with a selected media results in an updated target which may or may not be further augmented. Updated videos are candidates for further augmentation as the video plays. In this regard, it need not be necessary to select the entirety of the augmentations when target video delivery begins; they can be determined dynamically as the video plays and selected based at least in part on any prior augmentations that were already made to the video.

When there is no more content to add (318, NO) and the base portion (perhaps having been modified with augmentation media overlays) ends, the flow proceeds to playing back each appended video (320 and 322, YES) until there are no more appended videos to play back (322, NO).

As in the example of FIG. 2, purchase history can be tracked and the effectiveness of the augmented video can be ascertained and updated in the augmented video's package characteristics.

Figure 4:
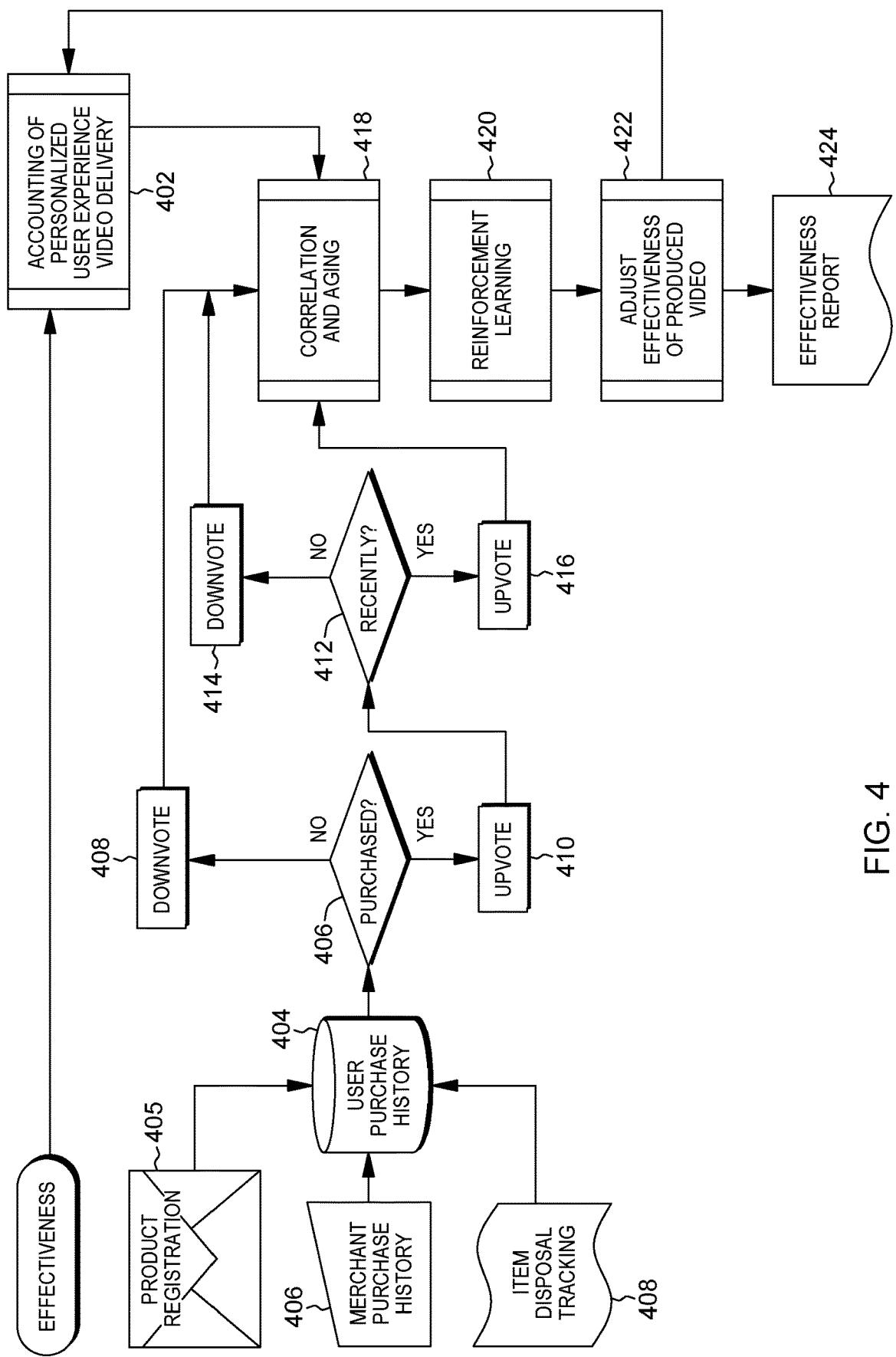
FIG. 4 depicts an example learning effectiveness flow, in accordance with aspects described herein.

FIG. 4 depicts an example learning effectiveness flow, in accordance with aspects described herein. As described above, an accounting 402 of personalized user experience video delivery to a user is made. Meanwhile, user purchase history 404 is tracked, for example using electronic means based on detected product registrations 405, accessible purchase histories with merchants 406, and item disposal tracking technologies 408, such as document scanning, barcode scanning, and voice recognition technology incorporated with trashcans, shredding bins, or the like. An inquiry is made as to whether products/services that are the subject of augmented videos shown to the user were purchased. If not (406, NO), the video receives a downvote 408, otherwise (406, YES), the video receives an upvote 410. After receiving an upvote 410, an inquiry 412 is made as to whether the purchase was made recently (defined by any desired parameter, such as a within a particular timeframe). If not (412, NO), the video receives a downvote 414, otherwise (412, YES), the video receives an upvote 416.

The up/down voting occurs and the flow utilizes the results together with the accounting of the personalized user experience video delivery for correlation and aging 418 which correlates positive video impressions to purchases and the timing of events. This informs reinforcement learning 420 (e.g. machine learning) which can cognitively and automatically learn which videos, augmentations, augmentation characteristics (type, timing, size, position, etc.), timings, and any other significant factors influence user decision-making, and the extent of that influence. Indications of the effectiveness of produced augmented videos are adjusted 422 accordingly, and an effectiveness report 424 is generated for an administrator or other user.

In these aspects, a process can maintain and adjust an indicated effectiveness of augmented streaming media in influencing individual purchasing decisions. In some examples, this includes electronically tracking purchasing decisions of the user based on streaming the augmented streaming media to the user device and determining a relationship between the augmented streaming media and the user purchasing decisions. For a user that received the augmented video, that user's purchasing decisions can be monitored to determine whether/how user purchases relate to delivered augmented video. The determined relationship, if any, can be fed to a cognitive engine configured to adjust the indicated effectiveness of the augmented streaming media based on the determined relationship, and this adjustment can be performed based on output(s) of the cognitive engine.

Diarization is a process by which voice or text (speech) is ascribed to a speaker in a video. Conversational diarization is able to determine what content (verbal speech) has a provenance from which speaker. This is an approach for crediting utterances to the correct speakers. When this occurs, relevant content created for individual consumption can be related to the social network or other sources that created such content. The content can be in the form of text, images, sound and/or video, as examples. Conversational diarization aspects can measure disfluencies within conversational content between people and robots to attribute the source of the content. In turn, entities, such as marketers, can provide meta parameters such as the breadth and depth of the social network to include. The information can be merged through word embedding within the correlation and aging aspect described herein. The merging can provide sharp personalized experiences.

In an example diarization flow, a video file, such as an MP4 file, can be broken into audio (e.g. .wav) and images (e.g. jpg). A spectrogram is made from the audio and can be correlated to specific sources, entities, people, etc., and saved as vectors which can be associated to diarization. Meanwhile specific individuals can be detected from the images portion of the video. Long short-term memory (LSTM) recurrent neural networks can be used in conjunction with the vectors to assign vectors to speakers in the images, thus diarizing the audio to speakers.

The ability to provide a dynamic, tailored user experience can change the way user decision-making is influenced. By using feedback and correlation as described herein, aspects connect the delivery of a tailored augmented streaming media to end-user decision-making (e.g. purchasing decisions). This can provide critical real-time linkages to measure the effectiveness of the augmentations made to target media and feed these measurements back into the system. By using machine learning and analytics, the system can be tuned to increase the accuracy and performance of its algorithms and methods for augmenting other media to more successfully achieve the intended goals of the augmented media.

Figure 5:
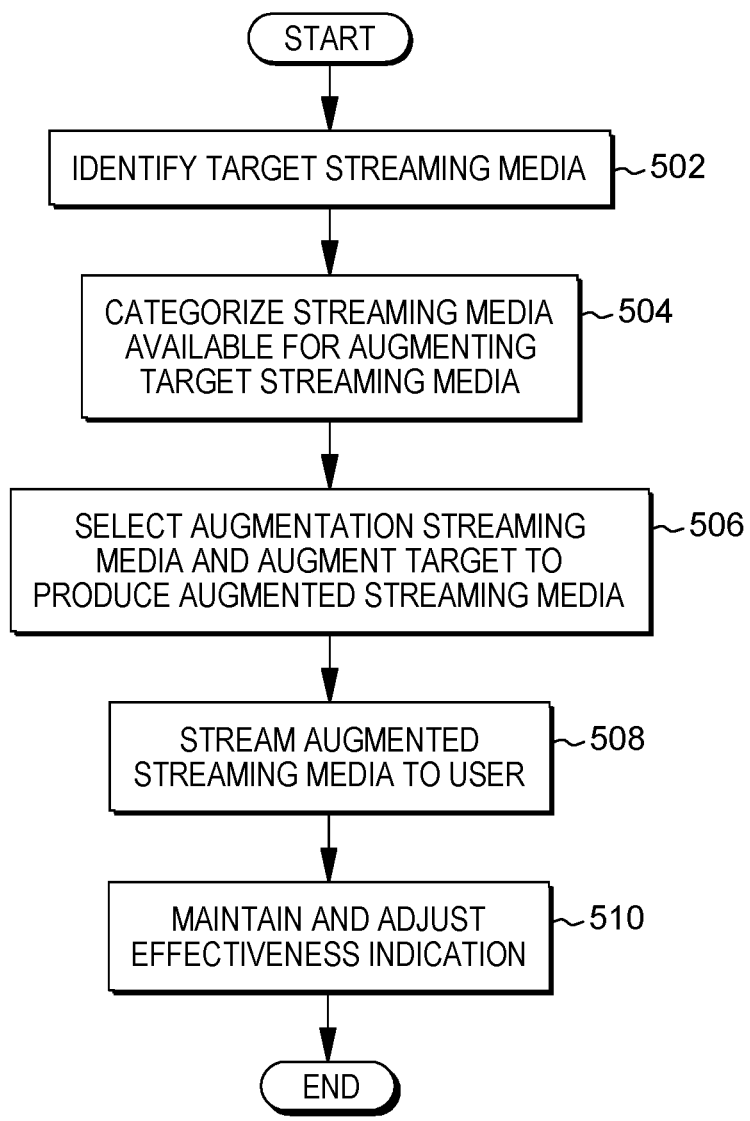
FIG. 5 depicts an example process for streaming media augmentation and delivery, in accordance with aspects described herein.

FIG. 5 depicts an example process for streaming media augmentation and delivery, in accordance with aspects described herein. In some examples, the process is performed by one or more computer systems, such as those described herein, which may include one or more computer systems that host and/or stream media to end-user devices, and/or one or more other computer systems.

The process identifies target streaming media, such as video and/or audio, to be streamed to a user device of a user (502). The media is to be streamed in the sense that the target has or will at some point be identified for conveying to the user. The process also categorizes a plurality of streaming media that is available for augmenting the target streaming media, and produces, based on the categorizing, a set of candidate augmentation streaming media (504). The set of candidate augmentation streaming media can be a library of media that is available to augment other (i.e. target) streaming media.

The categorization (504) can occur at any time relative to the identifying (502), for instance before, during, or after. In some examples, the categorizes media includes at least some snippets of publicly-available streaming media, at least some social media-sourced streaming media, and at least some privately-available streaming media made available to users on a subscription or entitlement basis.

The process also selects at least one augmentation streaming media, of the set of candidate augmentation streaming media, and augments the target streaming media with the selected at least one augmentation streaming media to produce an augmented steaming media (506). Each selected augmentation streaming media may be selected based on any desired criteria. In a particular example, the selection is based at least in part on the selected augmentation streaming media being a demonstration of one or more applications of a subject of the target streaming media. The subject of the target streaming media can be a product or service and the one or more applications can include one or more uses of the product or service. The target streaming media can be, for example, an advertisement depicting a standard use of the product or service, and a selected augmentation streaming media of the at least one augmentation streaming media can depict an alternative use for that product or service. A selected augmentation streaming media of the at least one augmentation streaming media could be an instructional video for usage of the product or service. Additionally or alternatively, the process could identify a user problem that the product or service addresses, and a selected augmentation streaming media of the at least one augmentation streaming media could be selected based on the selected augmentation streaming media demonstrating a solution to the identified user problem.

The augmenting can include prepending a selected augmentation streaming media of the at least one augmentation streaming media to the target streaming media, appending the selected augmentation streaming media to the target streaming media, overlaying the target streaming media with the selected augmentation streaming media, and/or inserting the selected augmentation streaming media into the target streaming media.

In some examples, the selecting the at least one augmentation streaming media is based on content of the target streaming media, for instance what the target media is about, and on correlating the content to a classification of user preferences, a social media footprint, and/or information about the user. The selected at least one augmentation streaming media can include a privately-available streaming media that is available to the user based on a user subscription for access to the privately-available streaming media.

Selecting the at least one augmentation streaming media can select a plurality of augmentation streaming media. In particular embodiments where the at least one selected augmentation streaming media includes a plurality of selected media, the selecting the plurality of media and the augmenting the target streaming media can includes iterating (i) the selection of a next augmentation streaming media, of the plurality of augmentation streaming media, based on content of the target streaming media, and (ii) the augmentation of the target streaming media with the selected next augmentation streaming media to produce an updated target streaming media, where the updated target streaming media is the target streaming media used in a next iteration of the iterating for the selecting and the augmenting.

Continuing with the process of FIG. 5, based on an initiation to stream the target streaming media to the user device, the process streams (instead or in addition to the target streaming media) the augmented streaming media to the user device (508). The initiation to stream the target streaming media can be actual call (request) for the target media to be delivered to the user device. The augmented media can be delivered to the user's device based on that call. In some examples, the augmented media is delivered in place of the target media, though in other examples some or all of the un-augmented target is streamed to the user.

The process continues by maintaining and adjusting an indicated effectiveness of the augmented streaming media (510). The effectiveness monitored can be for any desired effectiveness, for instance effectiveness in influencing individual purchasing decisions. In such examples, this maintaining and adjusting can include (i) electronically tracking purchasing decisions of the user based on streaming the augmented streaming media to the user device, and determining a relationship between the augmented streaming media and the user purchasing decisions, (ii) feeding the determined relationship to a cognitive engine configured to adjust the indicated effectiveness of the augmented streaming media based on the determined relationship, and (iii) adjusting the indicated effectiveness of the augmented streaming media based on an output of the cognitive engine.

In examples where the augmentation media and target media include video, the augmenting can further include determining a timing at which the selected augmentation video is to be visually presented to overlay the target video and a position for the selected augmentation video in overlaying the target video. Streaming the augmented media to the user device in this example can present the selected augmentation streaming media at the determined timing and position.

In "offline" augmentation embodiments, the identifying (502) can be realized by offline selection of the target video from which to produce an augmented video that is to be packaged for later retrieval and streaming. Such later streaming can be triggered by the initiation to stream the target video to a particular user. The producing the augmented steaming media can therefore occur prior to identifying the user and prior to the initiation to stream (508) the target streaming media to the user. In this manner, the augmentation video may be built with regard to user likes, problems, etc. but not of a specific user (or perhaps not of the specific user to which the augmented will later be streamed. When an end-user is later identified by user's likes, problems, etc., these can be matched to the already-produced augmented video for delivery to the user. Accordingly, an example process further includes based on the initiation to stream the target streaming media to the user, identifying the user and an associated user profile of the user, selecting the augmented streaming media from a library of prior-produced packaged augmented streaming media based on the user profile matching to the selected augmented streaming media, and initiating the streaming of the augmented streaming media to the user device.

In "online" augmentation embodiments, the target is initially selected to stream to the user, constituting both the identification of the target media (502) and the initiation to stream the target (508). Streaming the beginning portion of the target media commences and the target is dynamically augment in real-time. Thus, the initiation to stream the target streaming media to the user identifies the target streaming media and triggers the selecting the at least one augmentation streaming media based on a user profile matching to the selected at least one augmentation streaming media. The streaming the augmented streaming media to the user device can include commencing streaming the target streaming media to the user device, and performing the augmenting the target streaming media dynamically, and in real time, to simultaneously produce the augmented streaming media and stream the augmented streaming media to the user device.

Although various examples are provided, variations are possible without departing from a spirit of the claimed aspects.

Figure 6:
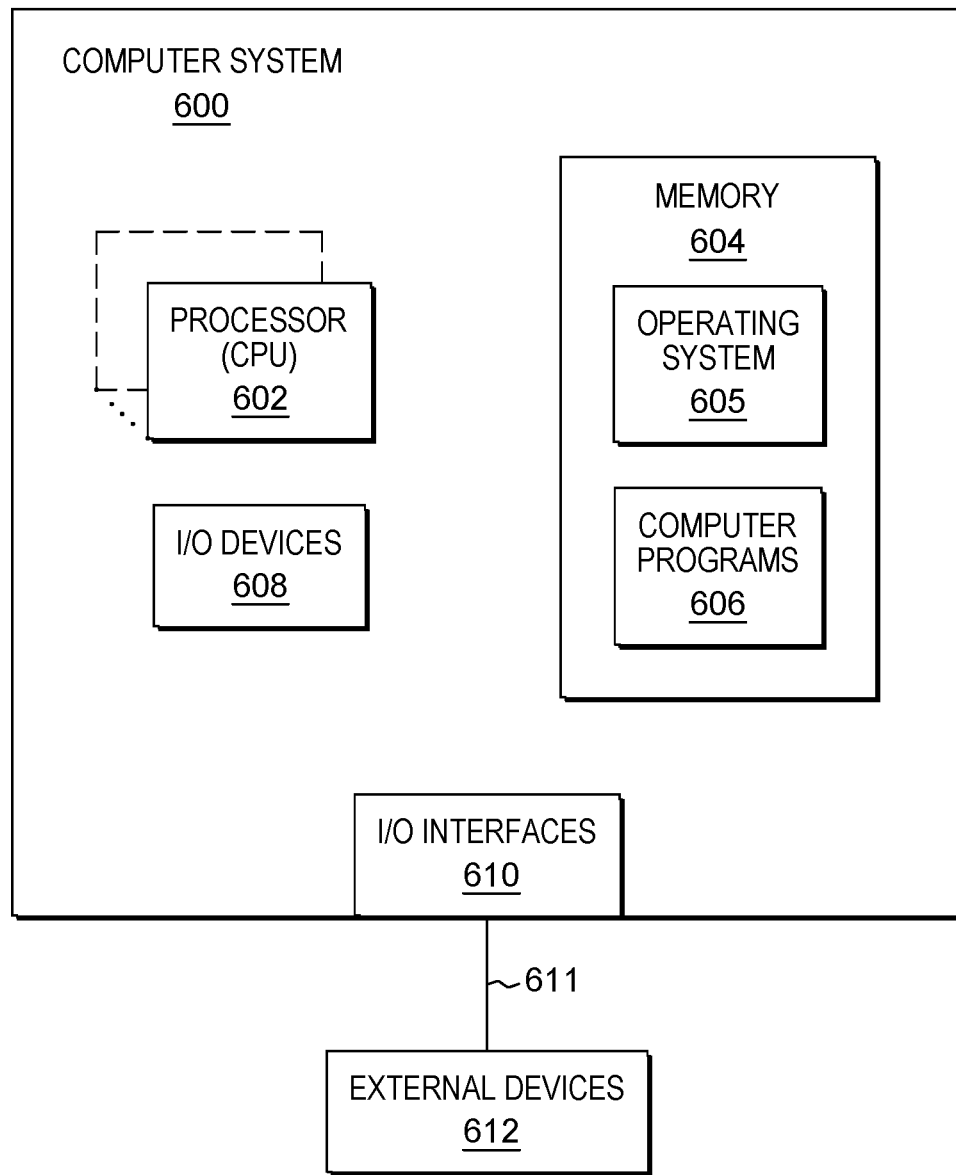
FIG. 6 depicts one example of a computer system and associated devices to incorporate and/or use aspects described herein.

Processes described herein may be performed singly or collectively by one or more computer systems, such as one or more streaming media servers, as an example. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
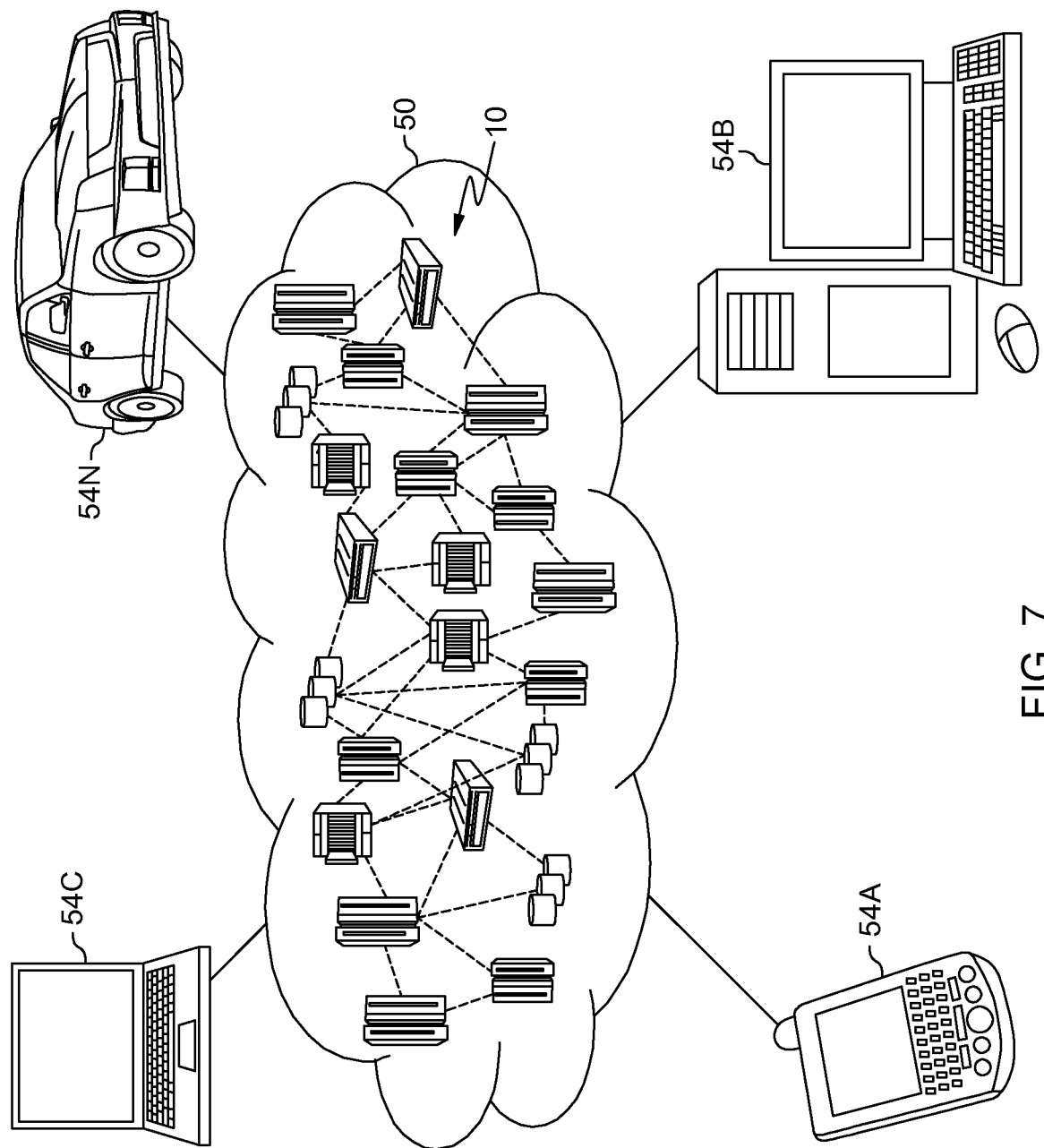
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
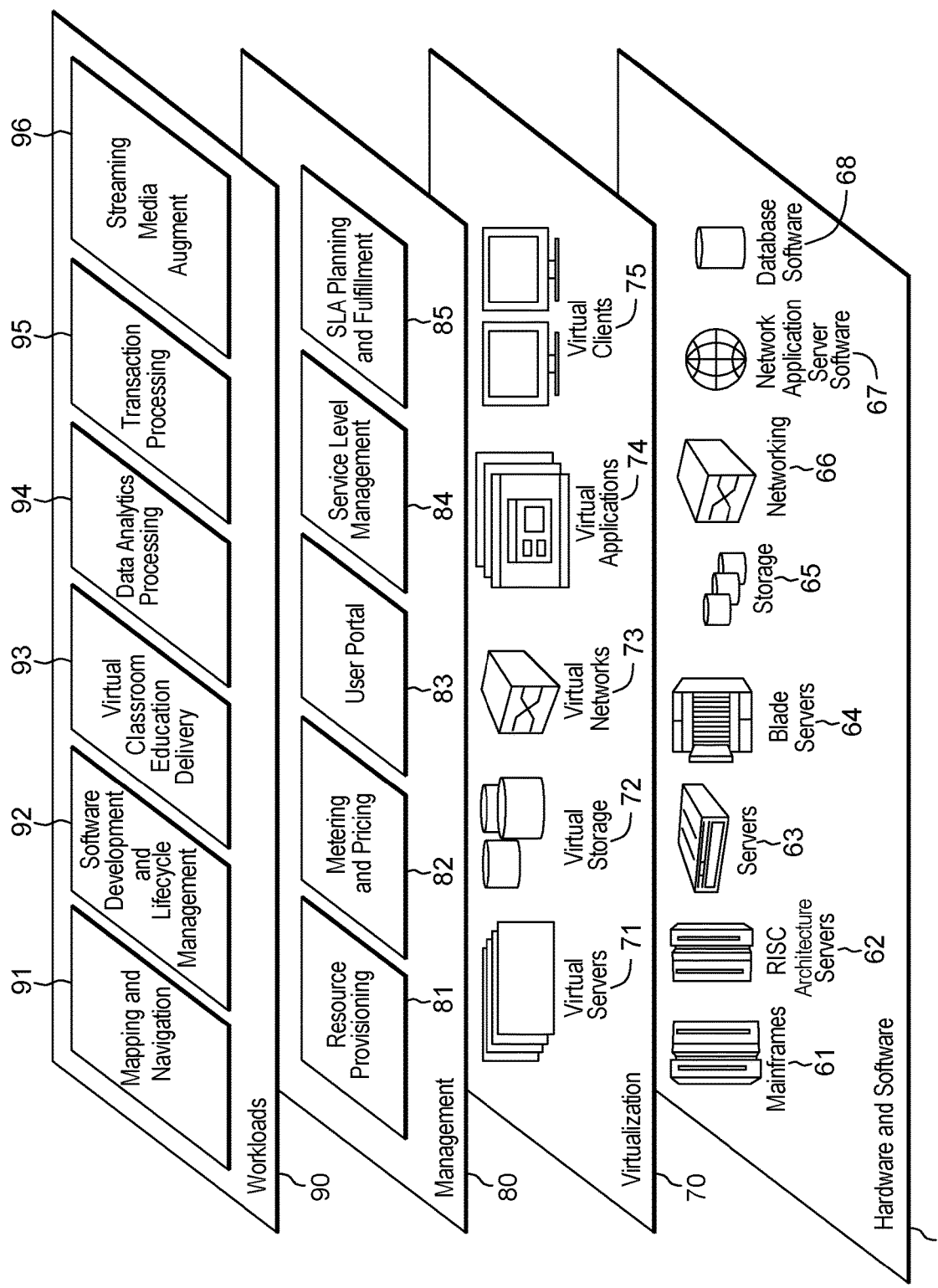
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and streaming media augmentation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
identifying target streaming media to be streamed to a user device of a user;
categorizing a plurality of streaming media available for augmenting the target streaming media, and producing, based on the categorizing, a set of candidate augmentation streaming media;
selecting at least one augmentation streaming media of the set of candidate augmentation streaming media, and augmenting the target streaming media with the selected at least one augmentation streaming media to produce an augmented streaming media, wherein each selected augmentation streaming media is selected based at least in part on the selected augmentation streaming media being a demonstration of one or more applications of a subject of the target streaming media, wherein the subject of the target streaming media is a product or service, wherein the one or more applications comprise one or more uses of the product or service, wherein the target streaming media is an advertisement depicting a first use of the product or service, and wherein a selected augmentation streaming media of the at least one augmentation streaming media depicts a second use for that product or service that is an alternative to the first use of the product or service; and
based on an initiation to stream the target streaming media to the user device, streaming the augmented streaming media to the user device.

2. The method of claim 1, wherein the augmenting comprises at least one selected from the group consisting of: prepending a selected augmentation streaming media of the at least one augmentation streaming media to the target streaming media, appending the selected augmentation streaming media to the target streaming media, overlaying the target streaming media with the selected augmentation streaming media, and inserting the selected augmentation streaming media into the target streaming media.

3. The method of claim 2, wherein the target streaming media is a target video and the selected augmentation streaming media is a selected augmentation video, and wherein the augmenting further comprises determining a timing at which the selected augmentation video is to be visually presented to overlay the target video and a position for the selected augmentation video in overlaying the target video, wherein streaming the augmented video to the user device presents the selected augmentation streaming media at the determined timing and position.

4. The method of claim 1, wherein the selecting the at least one augmentation streaming media is based on content of the target streaming media and on correlating the content to a social media footprint about the user.

5. The method of claim 1, wherein a selected augmentation streaming media of the at least one augmentation streaming media is an instructional video for usage of the product or service.

6. The method of claim 1, further comprising identifying a user problem that the product or service addresses, wherein a selected augmentation streaming media of the at least one augmentation streaming media is selected based on the selected augmentation streaming media demonstrating a solution to the identified user problem.

7. The method of claim 1, further comprising:
maintaining an indicated effectiveness of the augmented streaming media in influencing individual purchasing decisions;
electronically tracking purchasing decisions of the user based on streaming the augmented streaming media to the user device, and determining a relationship between the augmented streaming media and the user purchasing decisions;
feeding the determined relationship to a cognitive engine configured to adjust the indicated effectiveness of the augmented streaming media based on the determined relationship; and
adjusting the indicated effectiveness of the augmented streaming media based on an output of the cognitive engine.

8. The method of claim 1, wherein the categorized plurality of streaming media comprises at least some snippets of publicly-available streaming media, at least some social media-sourced streaming media, and at least some privately-available streaming media made available to users on a subscription or entitlement basis.

9. The method of claim 8, wherein the selected at least one augmentation streaming media comprises a privately-available streaming media that is available to the user based on a user subscription for access to the privately-available streaming media.

10. The method of claim 1, wherein the producing the augmented streaming media occurs prior to identifying the user and prior to the initiation to stream the target streaming media to the user, and wherein the method further comprises:
based on the initiation to stream the target streaming media to the user, identifying the user and an associated user profile of the user;
selecting the augmented streaming media from a library of prior-produced packaged augmented streaming media based on the user profile matching to the selected augmented streaming media; and
initiating the streaming the augmented streaming media to the user device.

11. The method of claim 1, wherein the initiation to stream the target streaming media to the user identifies the target streaming media and triggers the selecting the at least one augmentation streaming media based on a user profile matching to the selected at least one augmentation streaming media, and wherein the streaming the augmented streaming media to the user device comprises:
commencing streaming the target streaming media to the user device; and
performing the augmenting the target streaming media dynamically, and in real time, to simultaneously produce the augmented streaming media and stream the augmented streaming media to the user device.

12. The method of claim 1, wherein the selecting the at least one augmentation streaming media selects a plurality of augmentation streaming media, wherein the selecting the plurality of augmentation streaming media and the augmenting the target streaming media comprises iterating:
selecting a next augmentation streaming media, of the plurality of augmentation streaming media, based on content of the target streaming media; and
augmenting the target streaming media with the selected next augmentation streaming media to produce an updated target streaming media, wherein the updated target streaming media is the target streaming media used in a next iteration of the iterating for the selecting and the augmenting.

13. A computer system comprising:
a memory; and
a processor in communication with the memory, wherein the computer system is configured to perform a method comprising:
identifying target streaming media to be streamed to a user device of a user;
categorizing a plurality of streaming media available for augmenting the target streaming media, and producing, based on the categorizing, a set of candidate augmentation streaming media;
selecting at least one augmentation streaming media of the set of candidate augmentation streaming media, and augmenting the target streaming media with the selected at least one augmentation streaming media to produce an augmented streaming media, wherein each selected augmentation streaming media is selected based at least in part on the selected augmentation streaming media being a demonstration of one or more applications of a subject of the target streaming media, wherein the subject of the target streaming media is a product or service, wherein the one or more applications comprise one or more uses of the product or service, wherein the target streaming media is an advertisement depicting a first use of the product or service, and wherein a selected augmentation streaming media of the at least one augmentation streaming media depicts a second use for that product or service that is an alternative to the first use of the product or service; and
based on an initiation to stream the target streaming media to the user device, streaming the augmented streaming media to the user device.

14. The computer system of claim 13, wherein the selecting the at least one augmentation streaming media selects a plurality of augmentation streaming media, wherein the selecting the plurality of augmentation streaming media and the augmenting the target streaming media comprises iterating:
selecting a next augmentation streaming media, of the plurality of augmentation streaming media, based on content of the target streaming media; and
augmenting the target streaming media with the selected next augmentation streaming media to produce an updated target streaming media, wherein the updated target streaming media is the target streaming media used in a next iteration of the iterating for the selecting and the augmenting.

15. A computer program product comprising:
a computer readable storage medium readable by a processing circuit and storing instructions for execution by the processing circuit for performing a method comprising:
identifying target streaming media to be streamed to a user device of a user;
categorizing a plurality of streaming media available for augmenting the target streaming media, and producing, based on the categorizing, a set of candidate augmentation streaming media;
selecting at least one augmentation streaming media of the set of candidate augmentation streaming media, and augmenting the target streaming media with the selected at least one augmentation streaming media to produce an augmented streaming media, wherein each selected augmentation streaming media is selected based at least in part on the selected augmentation streaming media being a demonstration of one or more applications of a subject of the target streaming media, wherein the subject of the target streaming media is a product or service, wherein the one or more applications comprise one or more uses of the product or service, wherein the target streaming media is an advertisement depicting a first use of the product or service, and wherein a selected augmentation streaming media of the at least one augmentation streaming media depicts a second use for that product or service that is an alternative to the first use of the product or service; and based on an initiation to stream the target streaming media to the user device, streaming the augmented streaming media to the user device.

16. The computer program product of claim 15, wherein the selecting the at least one augmentation streaming media selects a plurality of augmentation streaming media, wherein the selecting the plurality of augmentation streaming media and the augmenting the target streaming media comprises iterating:

selecting a next augmentation streaming media, of the plurality of augmentation streaming media, based on content of the target streaming media; and augmenting the target streaming media with the selected next augmentation streaming media to produce an updated target streaming media, wherein the updated target streaming media is the target streaming media used in a next iteration of the iterating for the selecting and the augmenting.

* * * * *